United States Patent
Hirose

(10) Patent No.: US 10,734,907 B2
(45) Date of Patent: Aug. 4, 2020

(54) SYNCHRONOUS RECTIFIER CIRCUIT AND SWITCHING POWER SUPPLY APPARATUS

(71) Applicant: FUJITSU LIMITED, Kawasaki-shi, Kanagawa (JP)

(72) Inventor: Tatsuya Hirose, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/059,416

(22) Filed: Aug. 9, 2018

(65) Prior Publication Data

US 2019/0089264 A1    Mar. 21, 2019

(30) Foreign Application Priority Data

Sep. 19, 2017  (JP) ................................ 2017-178614

(51) Int. Cl.
*H02M 3/335*    (2006.01)
*H02M 3/28*     (2006.01)

(52) U.S. Cl.
CPC ....... *H02M 3/33592* (2013.01); *H02M 3/285* (2013.01); *H02M 3/33507* (2013.01)

(58) Field of Classification Search
CPC ........................... H02M 3/285; H02M 3/33592
See application file for complete search history.

(56) References Cited

U.S. PATENT DOCUMENTS

| | | | |
|---|---|---|---|
| 5,734,563 A | 3/1998 | Shinada | |
| 6,169,675 B1 | 1/2001 | Shimamori et al. | |
| 6,961,253 B1* | 11/2005 | Cohen | H02M 3/33592 363/89 |
| 2005/0180178 A1* | 8/2005 | Yang | H02M 3/33569 363/21.06 |
| 2006/0013022 A1* | 1/2006 | Jitaru | H02M 3/33592 363/21.12 |
| 2008/0055942 A1* | 3/2008 | Tao | H02M 3/33592 363/21.03 |

FOREIGN PATENT DOCUMENTS

| | | |
|---|---|---|
| JP | H08-223906 A | 8/1996 |
| JP | H08-331842 A | 12/1996 |
| JP | H11-136934 A | 5/1999 |

* cited by examiner

*Primary Examiner* — Kyle J Moody
*Assistant Examiner* — Jye-June Lee
(74) *Attorney, Agent, or Firm* — Arent Fox LLP

(57) ABSTRACT

Based on a control voltage outputted by a secondary-side control circuit and a drain voltage of a second transistor that has a drain electrode connected to a primary winding of a transformer and performs switching operations based on a gate voltage, a control voltage generating circuit of a synchronous rectifier circuit generates the gate voltage of a first transistor. The gate voltage turns off the first transistor irrespective of the control voltage at timing where the drain voltage falls from a first value to a second value.

7 Claims, 12 Drawing Sheets

SYNCHRONOUS RECTIFIER CIRCUIT AND SWITCHING POWER SUPPLY APPARATUS

CROSS-REFERENCE TO RELATED APPLICATION

This application is based upon and claims the benefit of priority of the prior Japanese Patent Application No. 2017-178614, filed on Sep. 19, 2017, the entire contents of which are incorporated herein by reference.

FIELD

The embodiments discussed herein are related to a synchronous rectifier circuit and a switching power supply apparatus.

BACKGROUND

A switching power supply device is used as an AC (Alternating Current)/DC (Direct Current) converter or a DC/DC converter. One conventional configuration is an isolated switching power supply device where a primary-side circuit (in an AC/DC converter, the circuit on the side that receives power from an AC power supply) and a secondary-side circuit (in an AC/DC converter, the circuit on the side that outputs a DC voltage) are magnetically coupled but electrically isolated using a transformer. In an isolated switching power supply device, electrical shorting that occurs on one of the primary or secondary sides is prevented from affecting the other side. As one example, when an overvoltage occurs in the primary-side circuit, which may be caused by a lightning strike, it is possible to protect the equipment connected to the secondary-side circuit.

One example of a circuit for rectifying a voltage waveform generated by the secondary winding of a transformer is a synchronous rectifier circuit that includes a transistor connected to the secondary winding and rectifies the voltage by turning the transistor on or off at timing based on the voltage waveform. When a rectifier circuit composed of a diode and a capacitor is used, the conversion efficiency of the converter is restricted by the large power loss caused by the on voltage of the diode and the current flowing in the diode. With a synchronous rectifier circuit however, the on voltage of the transistor is low, which suppresses the power loss.

There is also a conventional technology where an auxiliary winding is provided on the secondary side of a transformer and the transistor in a synchronous rectifier circuit is controlled based on a voltage induced in the auxiliary winding (see for example Japanese Laid-open Patent Publication No. H08-223906, Japanese Laid-open Patent Publication No. H08-331842, and Japanese Laid-open Patent Publication No. H11-136934). However, in recent years, it has become common to use a control circuit, such as a dedicated control integrated circuit (IC), to precisely control the transistor of the synchronous rectifier circuit and thereby raise the conversion efficiency.

A switching power supply device has a discontinuous current mode, a critical current mode, and a continuous current mode as operation modes. In discontinuous current mode, transistors provided for switching purposes in the primary-side circuit and in the synchronous rectifier circuit are controlled so that the currents flowing the respective transistors both become 0 A at the same time for a certain period in each cycle in the current waveform. In critical current mode, each transistor is controlled so that the currents flowing in the transistors are both 0 A at one point in each cycle of the current waveform. In continuous current mode, each transistor is controlled so that there is no period or timing where the currents flowing in the respective transistors are 0 A at the same time. In continuous current mode, a larger output current may be obtained than in the other modes.

In a switching power supply device that controls the transistor in a synchronous rectifier circuit using a control circuit like that described above, when using continuous current mode, there has been the risk of the voltage at the terminals of a transistor connected to the secondary winding reaching a large positive voltage before the transistor is turned off. When the voltage at the terminals reaches a large positive value, a large current flows via the transistor toward the reference potential, producing a large power loss. This means that with a switching power supply device that uses isolated synchronous rectification, it has been difficult to achieve a higher output using continuous current mode.

SUMMARY

According to one aspect, there is provided a synchronous rectifier circuit including: a first transistor that has a first terminal, which is connected to a secondary winding of a transformer included in an isolated synchronous rectification-type switching power supply apparatus, and a second terminal, to which a first control voltage is applied, and performs a switching operation based on the first control voltage; a control circuit that detects a first voltage of the first terminal and outputs, based on the first voltage, a second control voltage that controls the switching operation of the first transistor; and a control voltage generating circuit that generates the first control voltage based on the second control voltage and one of a second voltage of a third terminal of a second transistor, which performs a switching operation based on a third control voltage, and a third voltage that changes at a same timing as the second voltage, wherein the third terminal is connected to the primary winding of the transformer and wherein the first control voltage turns the first transistor off irrespective of the second control voltage at timing where the second voltage falls from a first value to a second value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
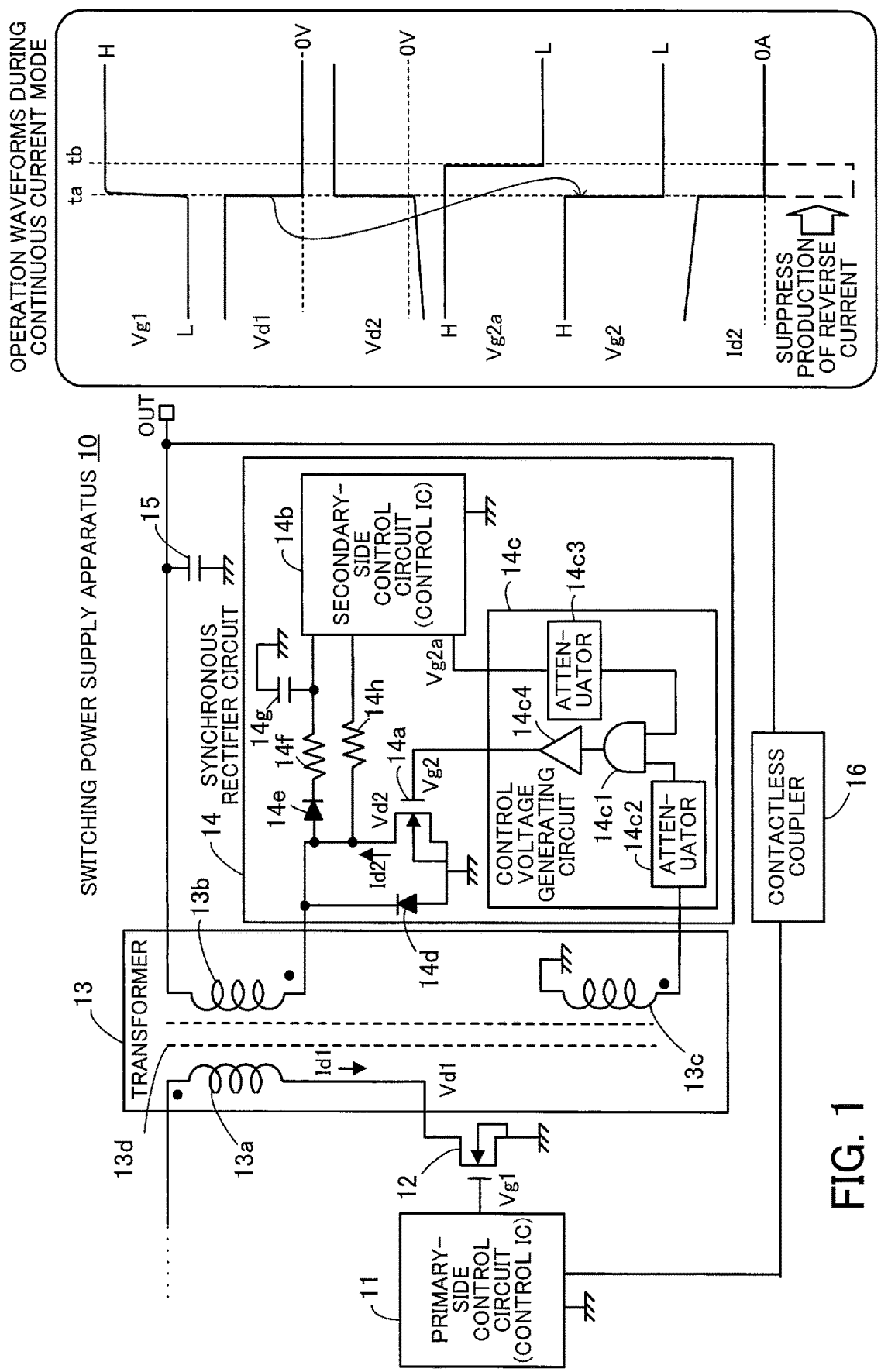
FIG. 1 depicts one example of a switching power supply apparatus and a synchronous rectifier circuit according to a first embodiment.

Several embodiments will be described below with reference to the accompanying drawings, wherein like reference numerals refer to like elements throughout.

First Embodiment

FIG. 1 depicts one example of a switching power supply apparatus and a synchronous rectifier circuit according to a first embodiment.

A switching power supply apparatus 10 that uses isolated synchronous rectification is an AC/DC converter or a DC/DC converter.

The switching power supply apparatus 10 includes a primary-side control circuit (hereinafter referred to as the "primary-side control IC") 11, which is included in a primary-side circuit, and a transistor 12. Note that in FIG. 1, aside from the primary-side control IC 11 and the transistor 12, the primary-side circuit of the switching power supply apparatus 10 is not illustrated. When the switching power supply apparatus 10 is an AC/DC converter, a rectifier that rectifies an AC voltage is included in the primary-side circuit.

The switching power supply apparatus 10 additionally includes a transformer 13 that magnetically couples but electrically isolates the primary-side circuit and a secondary-side circuit. The secondary-side circuit includes a synchronous rectifier circuit 14 and a capacitor 15. The switching power supply apparatus 10 also includes a contactless coupler 16.

Note that in the following description, it is assumed that the transistor 12 is an n-channel type FET (Field Effect Transistor). As examples, FET include Si (silicon) MOS (Metal-Oxide-Semiconductor) FET, FET that use GaN (gallium nitride) and FET that use GaAs (gallium arsenide).

The primary-side control IC 11 receives a power supply voltage (omitted from the drawings) and outputs a control voltage (hereinafter referred to as the "gate voltage Vg1") for switching the transistor 12 on and off with a predetermined frequency (hereinafter referred to as the "switching frequency"). As one example, the primary-side control IC 11 changes the ratio of the on time of the transistor 12 in one cycle (hereinafter referred to as the "duty ratio") by causing the switching power supply apparatus 10 to operate in one of discontinuous current mode, critical current mode, and continuous current mode. It is possible to change the duty ratio by changing the pulse width of the gate voltage Vg1.

The primary-side control IC 11 receives an error signal, which indicates an error between the output voltage (DC voltage) of the switching power supply apparatus 10 and an expected output voltage, from the contactless coupler 16. The primary-side control IC 11 then adjusts the duty ratio to an appropriate value based on the error signal.

Note that the primary-side control IC 11 is connected to a terminal (hereinafter referred to as "GND") that serves as a reference potential. Although 0V is used in the following description, the reference potential is not especially limited to 0V.

The transistor 12 includes a drain electrode that is connected to a primary winding 13a of the transformer 13, a source electrode connected to GND, and a gate electrode that is connected to the primary-side control IC 11. The transistor 12 performs switching operations based on the gate voltage Vg1 supplied from the primary-side control IC 11.

The transformer 13 includes the primary winding 13a, a secondary winding 13b, an auxiliary winding 13c, and a core 13d. Although schematically depicted in FIG. 1, the primary winding 13a, the secondary winding 13b, and the auxiliary winding 13c are wound on the core 13d. Note that the black circles placed near the ends of the windings indicate the winding start positions of the respective windings.

Although not illustrated, one end of the primary winding 13a is connected to a rectifier that rectifies an AC voltage when the switching power supply apparatus 10 is an AC/DC converter and is connected to a DC power supply when the switching power supply apparatus 10 is a DC/DC converter. Another end of the primary winding 13a is connected to the drain electrode of the transistor 12. One end of the secondary winding 13b is connected to one end of the capacitor 15 and to an output terminal OUT of the switching power supply apparatus 10. Another end of the secondary winding 13b is connected to the synchronous rectifier circuit 14. One end of the auxiliary winding 13c is connected to GND and another end is connected to the synchronous rectifier circuit 14.

The synchronous rectifier circuit 14 includes a transistor 14a, a secondary-side control circuit (hereinafter referred to as the "secondary-side control IC") 14b, a control voltage generating circuit 14c, diodes 14d and 14e, a resistance element 14f, a capacitor 14g, and a resistance element 14h. Note that in the same way as the transistor 12, it is assumed in the following description that the transistor 14a is an n-channel FET.

The transistor 14a includes a drain electrode that is connected to the secondary winding 13b, a source electrode connected to GND, and a gate electrode to which a control voltage (hereinafter referred to as the "gate voltage Vg2") supplied from the control voltage generating circuit 14c is applied. The transistor 14a performs switching operations based on the gate voltage Vg2.

The secondary-side control IC 14b is connected to the drain electrode of the transistor 14a via the resistance element 14h and detects a drain voltage Vd2 in accordance with changes in a drain current Id2. Based on the drain voltage Vd2, the secondary-side control IC 14b outputs a control voltage Vg2a that controls switching operations of the transistor 14a.

Note that the secondary-side control IC 14b operates on a power supply voltage generated by the diode 14e, the resistance element 14f, and the capacitor 14g. The secondary-side control IC 14b is also connected to GND.

The control voltage generating circuit 14c generates the gate voltage Vg2 based on a drain voltage Vd1 of the transistor 12 and the control voltage Vg2a. In the switching power supply apparatus 10 according to the first embodiment, the control voltage generating circuit 14c receives a voltage that is proportional to the drain voltage Vd1 from the auxiliary winding 13c. That is, the control voltage generating circuit 14c detects changes in the drain voltage Vd1 via the auxiliary winding 13c.

As one example, as depicted in FIG. 1, the control voltage generating circuit 14c includes an AND (logical AND) circuit 14c1, attenuators 14c2 and 14c3, and an amplifier 14c4.

The AND circuit 14c1 calculates a logical AND for the output voltages of the attenuators 14c2 and 14c3.

The attenuator 14c2 attenuates a voltage obtained by the auxiliary winding 13c to an appropriate value for input into the AND circuit 14c1.

The attenuator 14c3 attenuates the control voltage Vg2a outputted by the secondary-side control IC 14b to an appropriate value for input into the AND circuit 14c1.

As one example, the attenuators 14c2 and 14c3 are realized by resistance elements.

The amplifier 14c4 generates and outputs the gate voltage Vg2 by amplifying the output voltage of the AND circuit 14c1 to an appropriate voltage for driving the transistor 14a.

Note that depending on the magnitude of the voltage obtained by the auxiliary winding 13c (which is adjustable via the turns ratio between the primary winding 13a and the auxiliary winding 13c) and the magnitude of the control voltage Vg2a, it may be possible to omit the attenuators 14c2 and 14c3. Similarly, when the output voltage of the AND circuit 14c1 is an appropriate value for driving the transistor 14a (which will depend on the type of the transistor 14a), the amplifier 14c4 may be omitted.

In this control voltage generating circuit 14c, the output voltage of the AND circuit 14c1 becomes the L (low) level at timing where the gate voltage Vg1 becomes an H (high) level to turn on the transistor 12 and the drain voltage Vd1 falls from a certain value to 0V. As a result, the gate voltage Vg2 also becomes the L level. This means that the transistor 14a is turned off irrespective of the control voltage Vg2a.

Note that the H level voltage is a higher voltage than a threshold voltage that turns on the transistors 12 and 14a and the L level voltage is a lower voltage (for example, 0V) than a threshold voltage that turns off the transistors 12 and 14a. When the transistors 12 and 14a have different threshold voltages, the H level voltage and the L level voltage may be set differently for the transistor 12 and the transistor 14a.

The diode 14d has a function for performing rectification during a period until synchronous rectification via switching operations by the transistor 14a commences. The anode of the diode 14d is connected to the source electrode of the transistor 14a and the cathode is connected to the drain electrode of the transistor 14a. Note that when the transistor 14a is an Si-MOSFET, the body diode formed inside the Si-MOSFET will realize the same function as the diode 14d, so that the diode 14d may be omitted.

The diode 14e, the resistance element 14f, and the capacitor 14g generate the power supply voltage that is a DC voltage on which the secondary-side control IC 14b operates.

The anode of the diode 14e is connected to the secondary winding 13b and the cathode is connected to one end of the resistance element 14f. Another end of the resistance element 14f is connected to one end of the capacitor 14g and the power supply terminal of the secondary-side control IC 14b. Another end of the capacitor 14g is connected to GND.

The capacitor 15 of the switching power supply apparatus 10 is provided to reduce ripple voltage. One end of the capacitor 15 is connected to the output terminal OUT and another end is connected to GND.

The contactless coupler 16 generates an error signal indicating an error between the output voltage of the switching power supply apparatus 10 and an expected output voltage, and transmits the error signal to the primary-side control IC 11 via a photo coupler, for example.

Examples of operation waveforms of the switching power supply apparatus 10 in continuous current mode are depicted in FIG. 1, but before describing these waveforms, the following description will first describe the three operation modes of a switching power supply apparatus.

As mentioned earlier, the switching power supply apparatus 10 has three operation modes, namely "discontinuous current mode", "critical current mode", and "continuous current mode".

Figure 2:
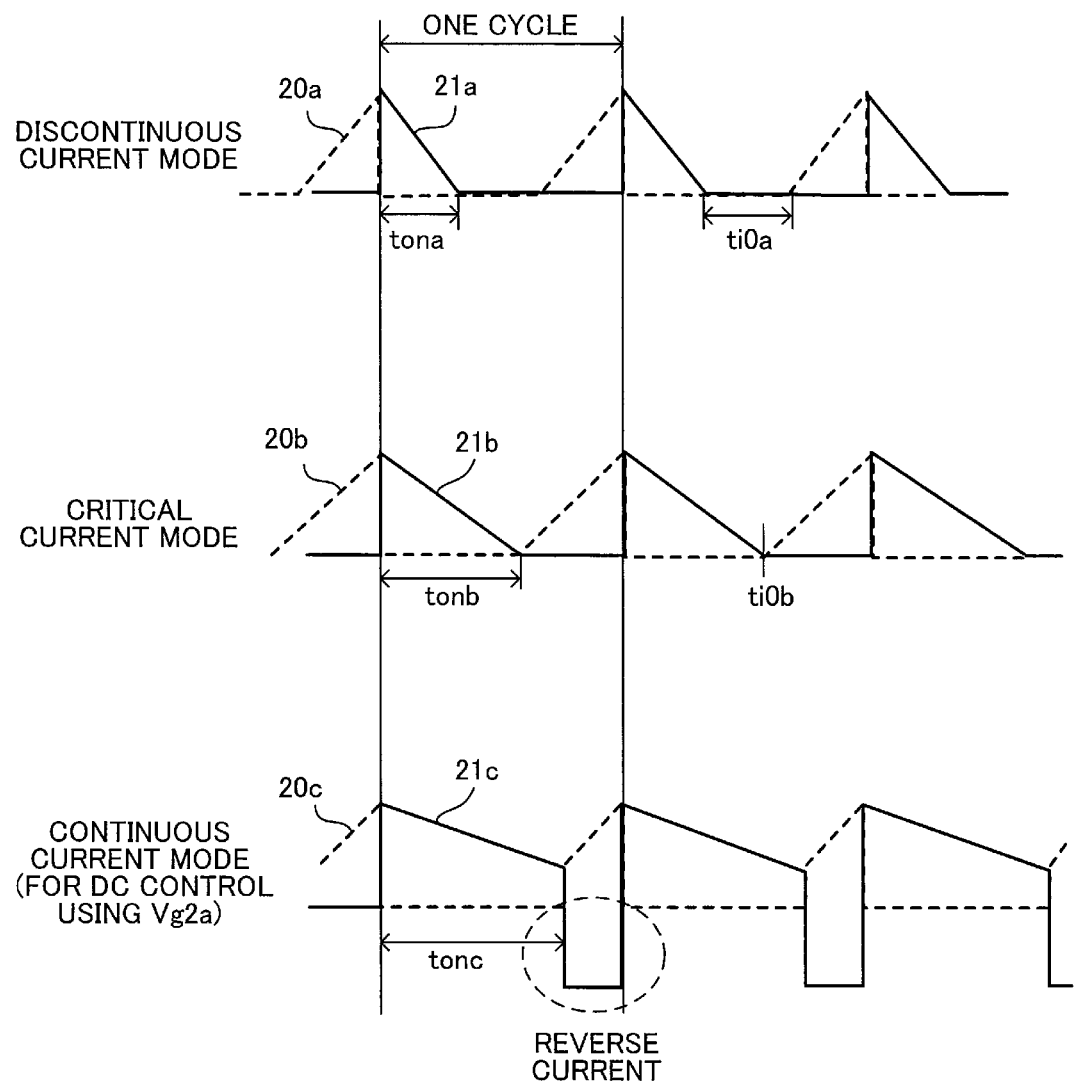
FIG. 2 depicts examples of current waveforms in three operation modes.

FIG. 2 depicts examples of the current waveforms in the three operation modes.

A waveform 20a is a waveform of a drain current Id1 of the transistor 12 in the primary-side circuit in discontinuous current mode and a waveform 21a is a waveform of a drain current Id2 of the transistor 14a of the synchronous rectifier circuit 14 in the secondary-side circuit in discontinuous current mode. A waveform 20b is a waveform of the drain current Id1 of the transistor 12 in critical current mode and a waveform 21b is a waveform of the drain current Id2 of the transistor 14a in critical current mode. A waveform 20c is a waveform of the drain current Id1 of the transistor 12 in continuous current mode and a waveform 21c is a waveform of the drain current Id2 of the transistor 14a in continuous current mode.

However, in FIG. 2, the waveform 21c in continuous current mode depicts the waveform of the drain current Id2 when the transistor 14a is directly driven by the control voltage Vg2a without using the control voltage generating circuit 14c depicted in FIG. 1. This is for comparison purposes with an operation waveform when the control voltage generating circuit 14c is used.

Note that in the following description, the drain current Id1 that flows from the drain electrode of the transistor 12 toward the source electrode (i.e., the electrode connected to GND) is assumed to have a positive value. Meanwhile, the drain current Id2 that flows from the source electrode of the transistor 14a toward the drain electrode (i.e., that flows toward the output electrode OUT) is also assumed to have a positive value.

In discontinuous current mode, there is a period ti0a where the drain currents Id1 and Id2 of the transistors 12 and 14a are both 0 A at the same time, and in the critical current mode, there is a timing ti0b where the drain currents Id1 and Id2 of the transistors 12 and 14a are both 0 A at the same time. In contrast, in continuous current mode, there is no period where the drain currents Id1 and Id2 of the transistors 12 and 14a are both 0 A at the same time.

As depicted in FIG. 2, in one cycle, the periods tona, tonb, and tonc where the transistor 14a is on are shortest in discontinuous current mode and longest in continuous current mode.

When the transistor 14a is driven using the control voltage Vg2a, as depicted in FIG. 2, there is the risk of a reverse current (i.e., a current flowing from the drain electrode toward the source electrode) flowing immediately after the period tonc (the reason for this will be described later).

Figure 3:
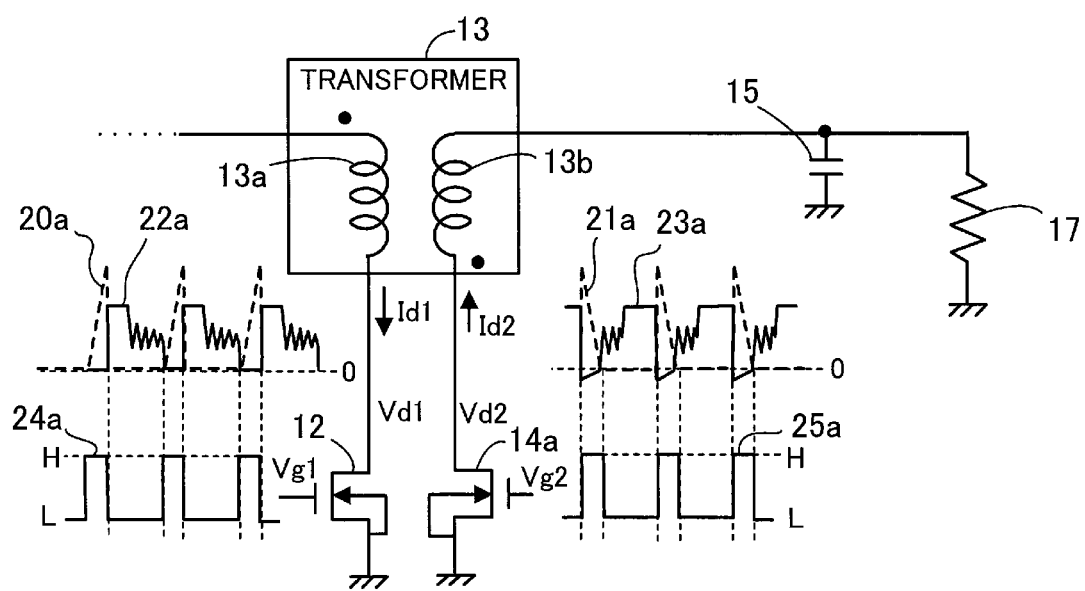
FIG. 3 depicts the operation of the switching power supply apparatus during discontinuous current mode.

FIG. 3 depicts the operation of the switching power supply apparatus during discontinuous current mode.

FIG. 3 includes only part of the switching power supply apparatus 10 depicted in FIG. 1, with other parts being omitted. Note that a load 17 connected to the output terminal OUT is depicted in FIG. 3.

A waveform 22a is the waveform of the drain voltage Vd1 of the transistor 12 in discontinuous current mode and a waveform 23a is the waveform of the drain voltage Vd2 of the transistor 14a in discontinuous current mode. Likewise, a waveform 24a is the waveform of the gate voltage Vg1 of the transistor 12 in discontinuous current mode and a waveform 25a is the waveform of the gate voltage Vg2 of the transistor 14a in discontinuous current mode.

When the gate voltage Vg1 of the transistor 12 rises from the L level to the H level, the transistor 12 is turned on, and the drain current Id1 flows as indicated by the waveform 20a from the drain electrode toward the source electrode so that magnetic energy accumulates in the transformer 13. At this time, as indicated by the waveform 22a, the drain voltage Vd1 is 0V. When the gate voltage Vg1 falls from the H level to the L level, the transistor 12 is turned off and the drain current Id1 becomes 0 A as indicated by the waveform 20a. At this time, as indicated by the waveform 22a, the drain voltage Vd1 rises from 0V.

When the transistor 12 is turned off, due to the magnetic energy accumulated in the transformer 13, first, the drain current Id2 flows via the body diode of the transistor 14a or the diode 14d depicted in FIG. 1 from the source electrode toward the drain electrode. At this time, the drain voltage Vd2 changes to a negative value as indicated by the waveform 23a. When this change is detected by the secondary-side control IC 14b depicted in FIG. 1, the secondary-side control IC 14b raises the control voltage Vg2a from the L level to the H level. Since the drain voltage Vd1 on the primary side rises at this time, the output voltage of the AND circuit 14c1 of the control voltage generating circuit 14c in FIG. 1 becomes the H level and the gate voltage Vg2 also becomes the H level as indicated by the waveform 25a. As a result, the transistor 14a is turned on.

As indicated by the waveforms 21a and 23a, due to the fall in the drain current Id2 caused by the decrease in the accumulated magnetic energy, the drain voltage Vd2 rises and when a given threshold is exceeded, the secondary-side control IC 14b lowers the control voltage Vg2a from the H level to the L level. By doing so, the output voltage of the AND circuit 14c1 of the control voltage generating circuit 14c in FIG. 1 becomes the L level and as indicated by the waveform 25a, the gate voltage Vg2 also becomes the L level, so that the transistor 14a is turned off. While the transistors 12 and 14a are both off, the drain voltages Vd1 and Vd2 both fluctuate due to resonance, but when the transistor 12 is turned on again, the drain voltage Vd2 becomes a constant value. After this, when the transistor 12 is turned off, the drain voltage Vd2 again changes to a negative value.

Note that the threshold mentioned above is set at a value where the accumulated amount of magnetic energy is regarded as having been completely spent. As one example, the threshold is a negative value produced by subtracting a predetermined offset value from 0V.

During discontinuous current mode, even when the secondary-side control IC 14b drives the transistor 14a using the control voltage Vg2a, the operation waveforms are the same as in FIG. 3. During continuous current mode however, when the secondary-side control IC 14b drives the transistor 14a using the control voltage Vg2a, as described earlier there is the risk of a reverse current flowing. The reason for this is given below.

Figure 4:
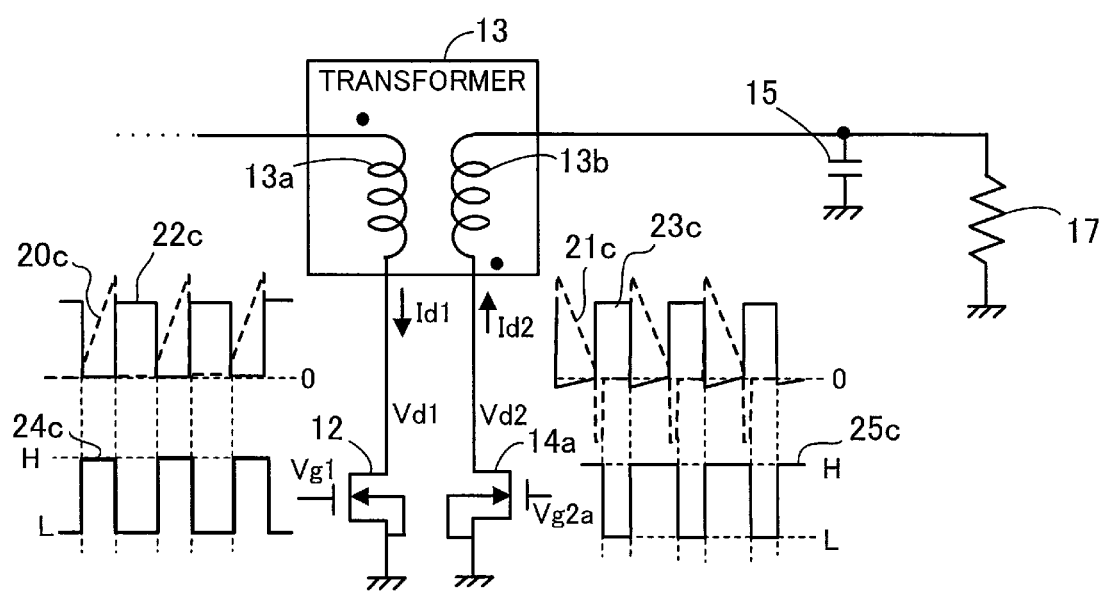
FIG. 4 depicts the reason why a reverse current occurs during continuous current mode.

FIG. 4 depicts the reason why a reverse current occurs during continuous current mode.

FIG. 4 depicts the same part of the switching power supply apparatus 10 as FIG. 3. However, in FIG. 4, an example operation for a case where the control voltage generating circuit 14c depicted in FIG. 1 is not used and the transistor 14a is driven directly by the control voltage Vg2a is depicted.

A waveform 22c is the waveform of the drain voltage Vd1 of the transistor 12 in continuous current mode and a waveform 23c is the waveform of the drain voltage Vd2 of the transistor 14a in continuous current mode. Likewise, a waveform 24c is the waveform of the gate voltage Vg1 of the transistor 12 in continuous current mode and a waveform 25c is the waveform of the control voltage Vg2a in continuous current mode.

When the gate voltage Vg1 of the transistor 12 rises from the L level to the H level, the transistor 12 is turned on, and the drain current Id1 flows as indicated by the waveform 20c from the drain electrode toward the source electrode so that magnetic energy accumulates in the transformer 13. At this time, as indicated by the waveform 22c, the drain voltage Vd1 is 0V. When the gate voltage Vg1 falls from the H level to the L level, the transistor 12 is turned off and the drain current Id1 becomes 0 A as indicated by the waveform 20c. At this time, as indicated by the waveform 22c, the drain voltage Vd1 rises from 0V.

When the transistor 12 is turned off, due to the magnetic energy accumulated in the transformer 13, first, the drain current Id2 flows via the body diode of the transistor 14a or the diode 14d depicted in FIG. 1 from the source electrode toward the drain electrode. At this time, the drain voltage Vd2 changes to a negative value as indicated by the waveform 23c. When this change is detected by the secondary-side control IC 14b depicted in FIG. 1, the secondary-side control IC 14b raises the control voltage Vg2a from the L level to the H level as indicated by the waveform 25c.

As described earlier, the drain voltage Vd2 rises as the drain current Id2 falls, and when a given threshold is exceeded, the secondary-side control IC 14b lowers the control voltage Vg2a from the H level to the L level. However, in the example in FIG. 4, before the drain voltage Vd2 exceeds the threshold (that is, before the accumulated magnetic energy is entirely spent), the drain voltage Vd1 falls to 0V due to the transistor 12 turning on. By doing so, in the secondary-side circuit, the drain voltage Vd2 increases to a large positive value irrespective of the control voltage Vg2a being at the H level (i.e., irrespective of the transistor 14a being in the on state). For this reason, as indicated by the waveform 21c, a large reverse current flows in a direction from the drain electrode of the transistor 14a toward the source electrode. That is, a state is produced where a large current is drawn from the load 17 side toward the transistor 14a, and due to the large drain voltage and the large reverse current, a large power loss is produced.

To solve this problem, instead of supplying the control voltage Vg2a directly to the gate electrode of the transistor 14a, the synchronous rectifier circuit 14 of the switching power supply apparatus 10 according to the first embodiment generates the gate voltage Vg2 to be supplied to the gate electrode of the transistor 14a based on the control voltage Vg2a and the drain voltage Vd1.

FIG. 1 depicts an example of parts of the operation waveforms during continuous current mode of the switching power supply apparatus 10 that generates the gate voltage Vg2 using the control voltage generating circuit 14c.

When the gate voltage Vg1 rises from the L level to the H level and the transistor 12 is turned on (timing ta), the drain current Id1 (whose waveform is not depicted in FIG. 1) flows and the drain voltage Vd1 becomes 0V. By doing so, the drain voltage Vd2 of the transistor 14a of the secondary-side circuit is forcibly raised to a positive value. The control voltage Vg2a falls at timing tb that is delayed by a predetermined period. As depicted in FIG. 4, when the transistor 14a is directly driven by the control voltage Vg2a, since the drain voltage Vd2 becomes a positive value in a state where the transistor 14a is on, a negative drain current Id2, that is, a reverse current, flows.

However, with the switching power supply apparatus 10 according to the first embodiment, due to the drain voltage Vd1 falling to 0V, the output voltage of the AND circuit 14c1 of the control voltage generating circuit 14c becomes the L level. As a result, the gate voltage Vg2 also becomes the L level. This means that the transistor 14a is turned off irrespective of the control voltage Vg2a. Accordingly, the drain current Id2 becomes 0 A and generation of a reverse current is suppressed, thereby suppressing the production of a power loss.

For the reason given above, it is possible to use continuous current mode that was effectively unusable with a conventional synchronous rectification-type switching power supply apparatus due to the large power loss. This makes it possible to achieve a larger output.

Note that although the control voltage generating circuit 14c generates the gate voltage Vg2 based on the drain voltage Vd1 and the control voltage Vg2a in the example described above, the present embodiments are not limited to this. In place of the drain voltage Vd1, a voltage that changes at the same timing as the drain voltage Vd1 may be used. As depicted in FIG. 1, the gate voltage Vg1 and the drain voltage Vd2 are examples of voltages that change at the same timing.

Second Embodiment

Figure 5:
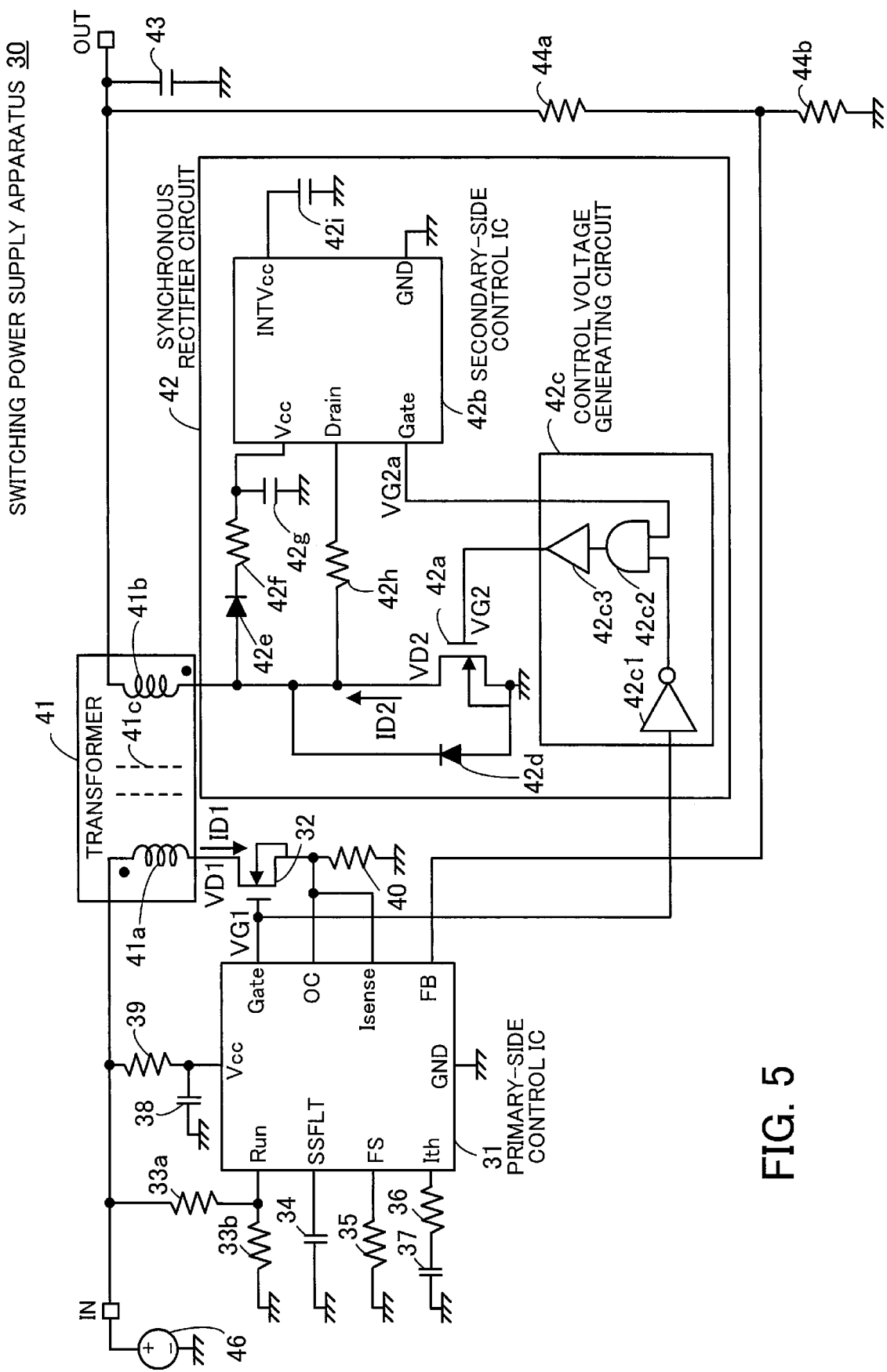
FIG. 5 depicts one example of a switching power supply apparatus and a synchronous rectifier circuit according to a second embodiment.

FIG. 5 depicts one example of a switching power supply apparatus and a synchronous rectifier circuit according to the second embodiment.

A switching power supply apparatus 30 according to the second embodiment is a DC/DC converter.

A primary-side circuit of the switching power supply apparatus 30 includes a primary-side control IC 31, a transistor 32, resistance elements 33a and 33b, a capacitor 34, resistance elements 35 and 36, capacitors 37 and 38, and resistance elements 39 and 40. The switching power supply apparatus 30 additionally includes a transformer 41 that magnetically couples but electrically isolates the primary-side circuit and a secondary-side circuit. The secondary-side circuit includes a synchronous rectifier circuit 42, a capacitor 43, and resistance elements 44a and 44b.

Note that in the following description, the transistor 32 is assumed to be an n-channel type FET. As examples, this FET may be an Si-MOSFET, a FET that uses GaN, or a FET that uses GaAs.

The primary-side control IC 31 outputs a gate voltage VG1 for switching the transistor 32 on and off with a predetermined switching frequency and duty ratio. As one example, the primary-side control IC 31 changes the duty ratio of the transistor 32 in one cycle by causing the switching power supply apparatus 30 to operate in one of discontinuous current mode, critical current mode, and continuous current mode.

Although an LT (registered trademark) 3805 made by Linear Technology Corporation is used as one example of the primary-side control IC 31, any component with the same functions may be used. The primary-side control IC 31 has a plurality of terminals marked "Run", "SSFLT", "FS", "Ith", "Vcc", "Gate", "OC", "Isense", "FB" and "GND".

The Run terminal is connected to one end of the resistance elements 33a and 33b that supply a determination voltage, which is used to determine whether to permit operations of the primary-side control IC 31, to the primary-side control IC 31. Another end of the resistance element 33a is connected to an input terminal IN of the switching power supply apparatus 30 and another end of the resistance element 33b is connected to GND.

The SSFLT terminal is connected to one end of the capacitor 34, which controls the rise in the output voltage of the output terminal OUT when application of an input voltage to the input terminal IN has commenced. Another end of the capacitor 34 is connected to GND.

The FS terminal is connected to one end of the resistance element 35 which decides the switching frequency. Another end of the resistance element 35 is connected to GND.

The Ith terminal is connected to a series circuit composed of the resistance element 36 and the capacitor 37 for adjusting the response speed of the voltage difference between a feedback voltage from the secondary-side circuit and an internal reference voltage. One end of the resistance element 36 is connected to the Ith terminal and another end of the resistance element 36 is connected to one end of the capacitor 37. Another end of the capacitor 37 is connected to GND.

The Vcc terminal is connected to one end of the resistance element 39 that supplies a power supply voltage to the primary-side control IC 31 and also to one end of the capacitor 38 for supplying electrical charge to the transistor 32. Another end of the resistance element 39 is connected to the input terminal IN and another end of the capacitor 38 is connected to GND.

The Gate terminal is connected to the gate electrode of the transistor 32 and the synchronous rectifier circuit 42.

The OC and Isense terminals are used to monitor the current flowing to the source electrode of the transistor 32 and are connected to the source electrode of the transistor 32 and one end of the resistance element 40. Another end of the resistance element 40 is connected to GND. When the detected current is an abnormal value, the primary-side control IC 31 stops the switching operations of the transistor 32, for example.

The FB terminal receives the feedback voltage generated by dividing the output voltage of the output terminal OUT using the resistance elements 44a and 44b. Based on the feedback voltage, the primary-side control IC 31 adjusts the duty ratio to an appropriate value so as to keep the output voltage constant.

The GND terminal is connected to GND.

The transistor 32 includes a drain electrode that is connected to a primary winding 41a of the transformer 41, a source electrode connected via the resistance element 40 to GND, and a gate electrode that is connected to the primary-side control IC 31. The transistor 32 is turned on and off in accordance with the gate voltage VG1 supplied from the primary-side control IC 31.

The transformer 41 includes the primary winding 41a, a secondary winding 41b, and a core 41c. Although schematically depicted in FIG. 5, the primary winding 41a and the secondary winding 41b are wound on the core 41c. Note that the black circles placed near the ends of the windings indicate the winding start positions of the respective windings.

One end of the primary winding 41a is connected to the input terminal IN. One end of the secondary winding 41b is connected to one end of the capacitor 43 and to the output terminal OUT of the switching power supply apparatus 30.

The other end of the secondary winding 41b is connected to the synchronous rectifier circuit 42.

The synchronous rectifier circuit 42 includes a transistor 42a, a secondary-side control IC 42b, a control voltage generating circuit 42c, diodes 42d and 42e, a resistance element 42f, a capacitor 42g, a resistance element 42h, and a capacitor 42i. Note that in the same way as the transistor 32, it is assumed in the following description that the transistor 42a is an n-channel FET.

The transistor 42a includes a drain electrode that is connected to one end of the secondary winding 41b, a source electrode that is connected to GND, and a gate electrode to which the gate voltage VG2 supplied from the control voltage generating circuit 42c is applied. The transistor 42a performs switching operations based on the gate voltage VG2.

Based on the drain voltage Vd2 of the transistor 42a, the secondary-side control IC 42b outputs a control voltage VG2a that controls switching operations of the transistor 42a.

Although an LT8309 made by Linear Technology Corporation is used as one example of the secondary-side control IC 42b, any component with the same functions may be used. The secondary-side control IC 42b has a plurality of terminals marked "Vcc", "Drain", "Gate", "INTVcc", and "GND".

A power supply voltage generated by the diode 42e, the resistance element 42f, and the capacitor 42g is supplied to the Vcc terminal, with the secondary-side control IC 42b operating on this power supply voltage.

The Drain terminal is connected to one end of the secondary winding 41b and the drain electrode of the transistor 42a via the resistance element 42h that is provided to detect the drain voltage Vd2 of the transistor 42a.

The Gate terminal is connected to the control voltage generating circuit 42c. The control voltage VG2a is outputted from this Gate terminal.

The INTVcc terminal is connected to one end of the capacitor 42i for supplying electrical charge to the gate electrode of the transistor 42a. Another end of the capacitor 42i is connected to GND.

The GND terminal is connected to GND.

The control voltage generating circuit 42c generates the gate voltage VG2 based on the control voltage VG2a and a voltage produced by inverting the logic level of the gate voltage VG1 of the transistor 32.

As one example, as depicted in FIG. 5, the control voltage generating circuit 42c includes an inverting amplifier (or "inverter") 42c1, an AND circuit 42c2, and an amplifier 42c3. Note that although not illustrated, it is possible for example for these elements to be connected to the output terminal OUT and to use the output voltage of the output terminal OUT as a power supply voltage.

The inverting amplifier 42c1 has an input terminal connected to a gate electrode of the transistor 32 and outputs a voltage produced by inverting the logic level of the gate voltage VG1.

The AND circuit 42c2 calculates a logical AND for the control voltage VG2a and the voltage produced by inverting the logic level of the gate voltage VG1.

The amplifier 42c3 generates and outputs the gate voltage VG2 by amplifying the output voltage of the AND circuit 42c2 to an appropriate value for driving the transistor 42a.

Note that when the output voltage of the AND circuit 42c2 is an appropriate value for driving the transistor 42a (this value will differ according to the type of transistor 42a), the amplifier 42c3 may be omitted.

The control voltage generating circuit 42c sets the output voltage of the inverting amplifier 42c1 at the L level at timing where the gate voltage VG1 becomes the H level (i.e., when the transistor 32 is on and the drain voltage Vd1 falls from a given value to 0V). Accordingly, the output voltage of the AND circuit 42c2 becomes the L level. By doing so, the gate voltage VG2 also becomes the L level. This means that the transistor 42a is turned off irrespective of the control voltage VG2a.

Note that the H-level gate voltages VG1 and VG2 are higher voltages than the threshold voltages where the transistors 32 and 42a are turned on, and the L-level gate voltages VG1 and VG2 are lower voltages (for example, 0V) than the threshold voltages where the transistors 32 and 42a are turned off. When the transistors 32 and 42a have different threshold voltages, the H-level gate voltages VG1 and VG2 and the L-level gate voltages VG1 and VG2 may be respectively different for the transistors 32 and 42a.

The diode 42d has a function for performing rectification in a period until synchronous rectification via switching operations by the transistor 42a commences. The anode of the diode 42d is connected to the source electrode of the transistor 42a and the cathode is connected to the drain electrode of the transistor 42a. Note that when the transistor 42a is an Si-MOSFET, the body diode formed inside the Si-MOSFET will realize the same function as the diode 42d, so that the diode 42d may be omitted.

The diode 42e, the resistance element 42f, and the capacitor 42g generate a power supply voltage that is a DC voltage on which the secondary-side control IC 42b operates.

The anode of the diode 42e is connected to one end of the secondary winding 41b and the cathode is connected to one end of the resistance element 42f. Another end of the resistance element 42f is connected to one end of the capacitor 42g and "Vcc" that is one terminal of the secondary-side control IC 42b. Another end of the capacitor 14g is connected to GND.

The capacitor 43 of the switching power supply apparatus 30 is provided to reduce ripple voltage. One end of the capacitor 43 is connected to the output terminal OUT and another end is connected to GND.

The series circuit composed of the resistance elements 44a and 44b is a resistance-based voltage-dividing circuit which generates the feedback voltage by dividing the output voltage of the output terminal OUT based on the ratio of the resistance values of the resistance elements 44a and 44b and supplies the feedback voltage to the primary-side control IC 31.

Note that since the switching power supply apparatus 30 is a DC/DC converter, a DC power supply 46 is connected to the input terminal IN.

Comparative Example

Before describing the operation of the switching power supply apparatus 30 according to the second embodiment, example simulation results will be described for an operation where the transistor 42a is directly driven by the control voltage VG2a outputted by the secondary-side control IC 42b as a comparative example.

Note that that example conditions given below were used as the simulation conditions.

The DC power supply 46 outputs a 48V DC voltage. 28.5 μH is used as the inductance value of the primary winding 41a of the transformer 41 and 0.8 μH is used as the inductance value of the secondary winding 41b. 100 kΩ is used as the resistance value of the resistance element 33a, 10 kΩ is used as the resistance value of the resistance element 33b, 0.01 μF is used as the capacitance value of the capacitor 34, and 140 kΩ is used as the resistance value of the resistance element 35. 56 kΩ is used as the resistance value of the resistance element 36, 0.0047 μF is used as the capacitance value of the capacitor 37, 10 μF is used as the capacitance value of the capacitor 38, 6.8 kΩ is used as the resistance value of the resistance element 39, and 0.021Ω is used as the resistance value of the resistance element 40. In addition, 10Ω is used as the resistance value of the resistance element 42f, 1 μF is used as the capacitance value of the capacitor 42g, 2.3 kΩ is used as the resistance value of the resistance element 42h, and 4.7 μF is used as the capacitance value of the capacitor 42i. 330 μF is used as the capacitance value of the capacitor 43, 10 kΩ is used as the resistance value of the resistance element 44a, and 1.905 kΩ is used as the resistance value of the resistance element 44b. Other conditions will not be described here.

Figure 6:
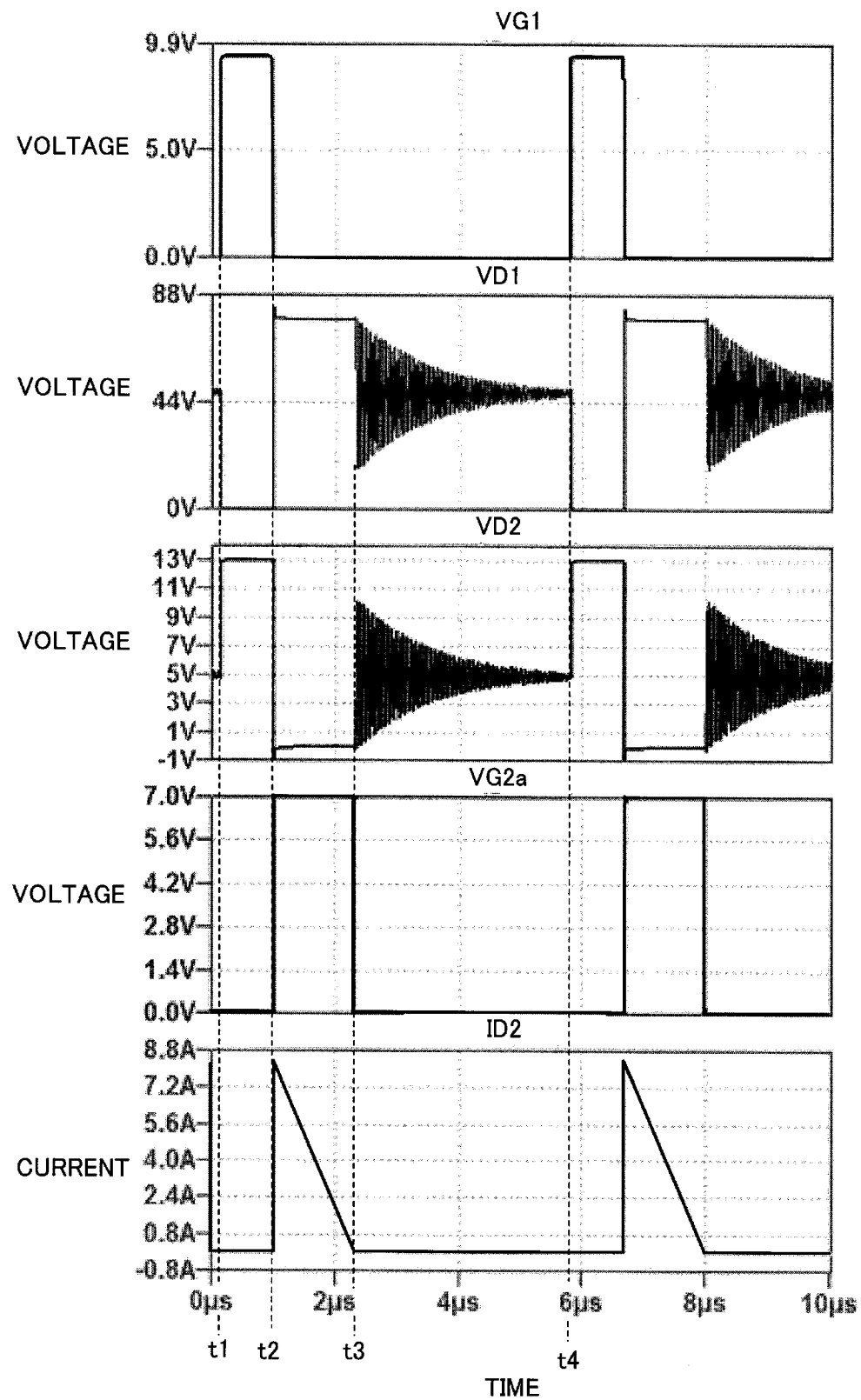
FIG. 6 depicts one example of operation simulation results in discontinuous current mode.

FIG. 6 depicts one example of operation simulation results in discontinuous current mode.

From the top in FIG. 6, the respective waveforms of the gate voltage VG1, the drain voltage VD1, the drain voltage VD2, the control voltage VG2a, and the drain current ID2 are depicted. The horizontal axis represents time and the vertical axis represents voltage for the graphs depicting voltage waveforms and represents current for the graphs depicting current waveforms.

When the gate voltage VG1 of the transistor 32 rises from the L level (in the example in FIG. 6, around 0V) to the H level (in the example in FIG. 6, around 8.8V) (at timing t1), the transistor 32 is turned on. By doing so, the drain current ID1 flows from the drain electrode toward the source electrode and magnetic energy accumulates in the transformer 41. At this time, the drain voltage VD1 is 0V. When the gate voltage VG1 falls from the H level to the L level (at timing t2), the transistor 32 is turned off and the drain voltage VD1 rises from 0V.

At timing t2, due to the magnetic energy accumulated in the transformer 41, the drain current ID2 flows via the body diode of the transistor 42a or the diode 42d from the source electrode toward the drain electrode. At this time, the drain voltage VD2 changes from a positive value to a negative value, and when this change is detected by the secondary-side control IC 42b, the secondary-side control IC 42b raises the control voltage VG2a from the L level (in the example in FIG. 6, 0.0V) to the H level (in the example in FIG. 6, 7.0V). By doing so, the transistor 42a is turned on.

The drain voltage VD2 rises as the drain current ID2 falls, and when a given threshold is exceeded (at timing t3), the secondary-side control IC 42b lowers the control voltage VG2a from the H level to the L level. By doing so, the transistor 42a is turned off. While the transistors 32 and 42a are both off, the drain voltages VD1 and VD2 both fluctuate due to resonance, but when the transistor 32 is turned on again (at timing t4), the drain voltage VD2 becomes a constant value (in the example in FIG. 6, around 13V).

In this way, during discontinuous current mode, even when the transistor 42a is directly driven using the control voltage VG2a outputted by the secondary-side control IC 42b, the drain current ID2 does not become a negative value and a large current loss is not produced.

Figure 7:
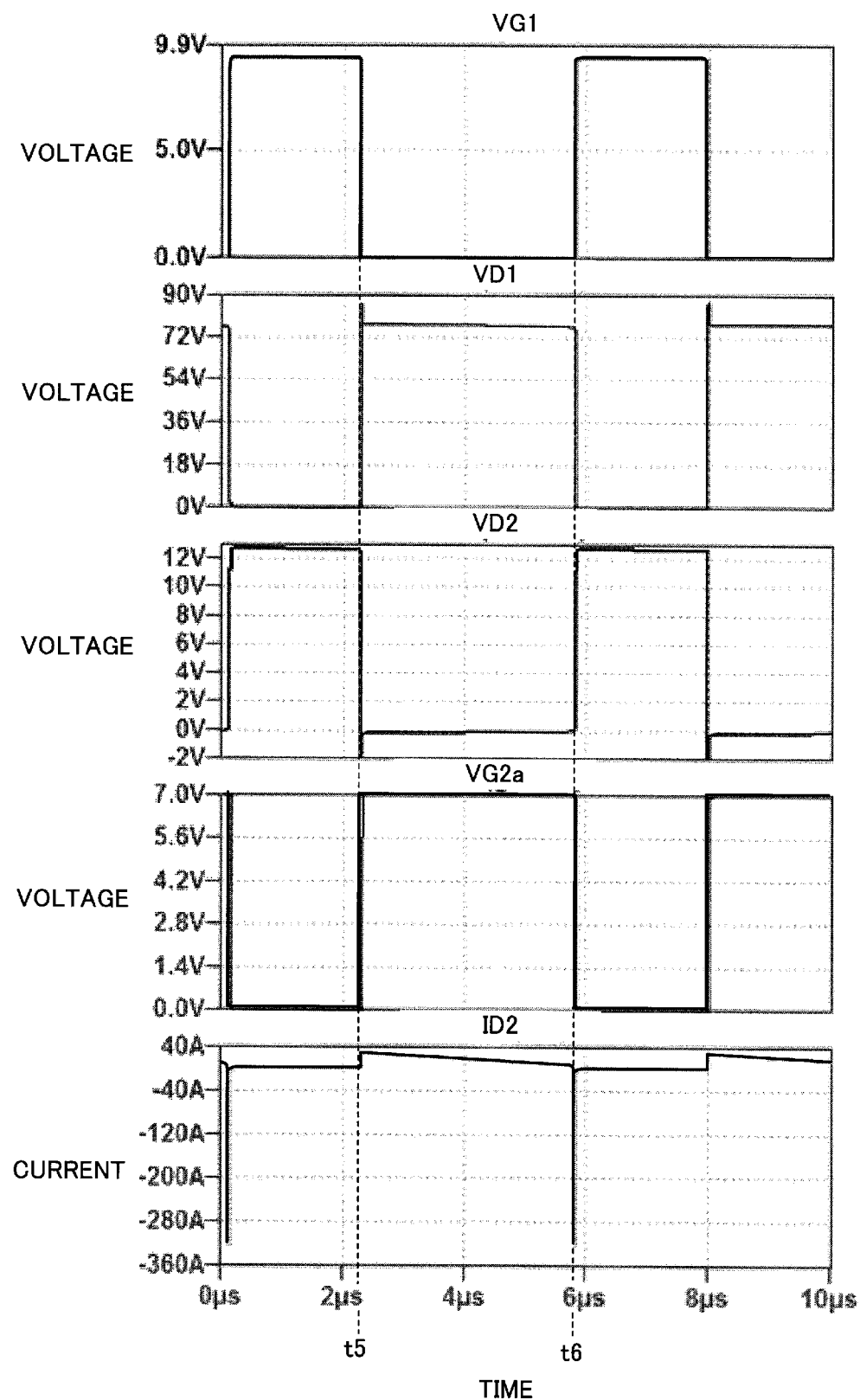
FIG. 7 depicts one example of operation simulation results in continuous current mode (for a comparative example)

FIG. 7 depicts one example of operation simulation results in continuous current mode (for the comparative example).

Figure 8:
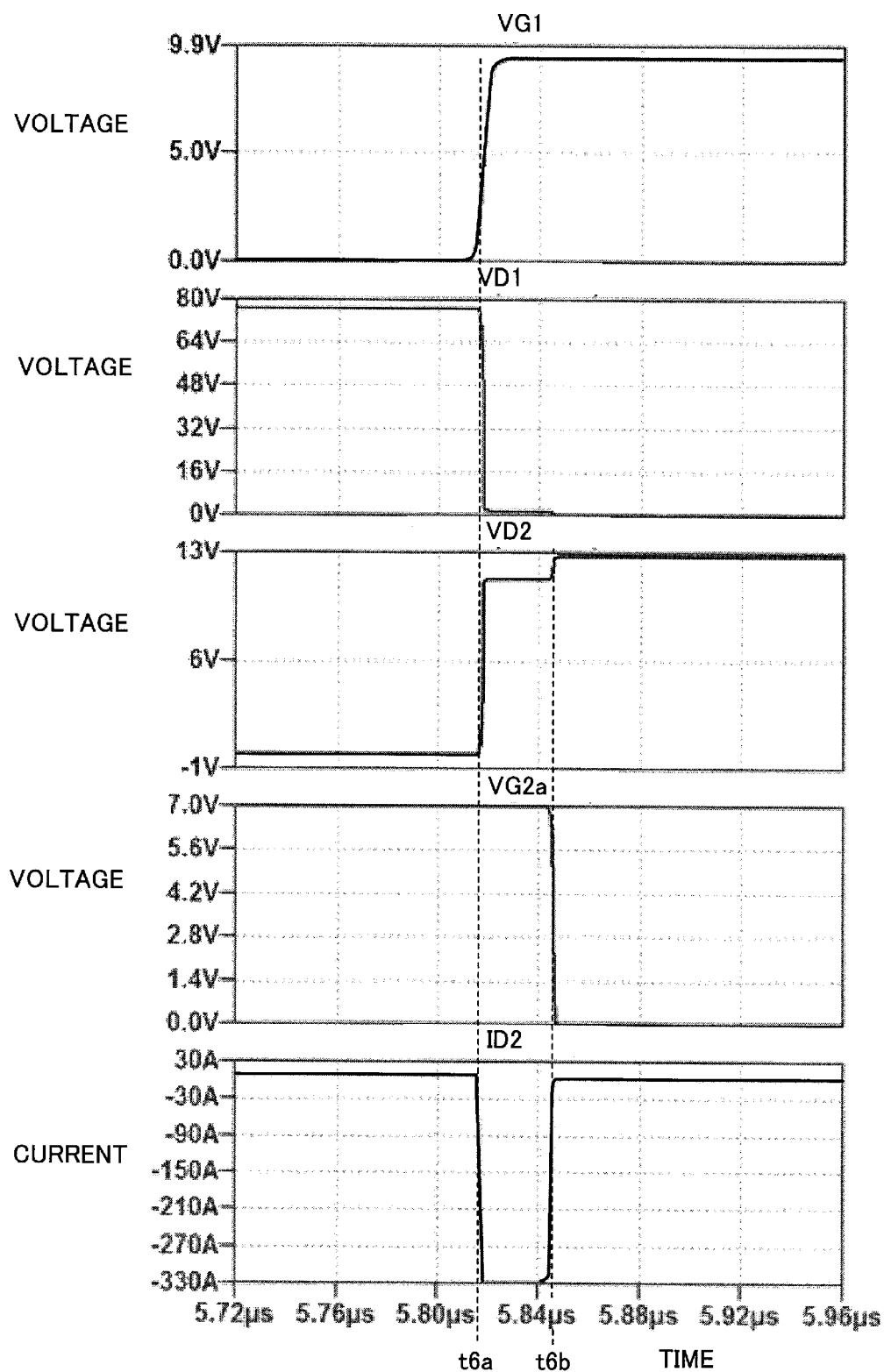
FIG. 8 is an enlargement of a period that is part of FIG. 7.

FIG. 8 is an enlargement of a period that is part of FIG. 7.

From the top in FIGS. 7 and 8, the respective waveforms of the gate voltage VG1, the drain voltage VD1, the drain voltage VD2, the control voltage VG2a, and the drain current ID2 are depicted. The horizontal axis represents time and the vertical axis represents voltage for the graphs depicting voltage waveforms and represents current for the graphs depicting current waveforms.

When the gate voltage VG1 of the transistor 32 falls from the H level to the L level (at timing t5), the transistor 32 is turned off. By doing so, the drain voltage VD1 rises from 0V.

When the transistor 32 is turned off, due to the magnetic energy accumulated in the transformer 41, the drain current ID2 also flows via the body diode of the transistor 42a or the diode 42d from the source electrode toward the drain electrode. At this time, the drain voltage VD2 changes to a negative value, and when this change is detected by the secondary-side control IC 42b, the secondary-side control IC 42b raises the control voltage VG2a from the L level to the H level.

As described earlier, when the drain voltage VD2 rises in keeping with the fall in the drain current ID2 and exceeds a given threshold, the secondary-side control IC 42b lowers the control voltage VG2a from the H level to the L level. However, in the example in FIG. 7, before the drain voltage VD2 exceeds the threshold (that is, before the accumulated magnetic energy is entirely spent), the drain voltage VD1 falls to 0V due to the transistor 32 turning on (at timing t6).

FIG. 8 is an enlargement of the voltage waveforms and current waveforms described above in period that includes timing t6. At timing t6a where the drain voltage VD1 falls to 0V, the drain voltage VD2 increases to a large positive value irrespective of the control voltage VG2a being at the H level (i.e., irrespective of the transistor 42a being in the on state). This means that until timing t6b where the control voltage VG2a becomes the L level and the transistor 42a is turned off, a large reverse current flows in a direction from the drain electrode of the transistor 42a toward the source electrode. That is, a large current is drawn from the output terminal OUT toward the transistor 42a, and due to the high drain voltage and a large reverse current, a large power loss is produced.

Example Operation in Continuous Current Mode of the Switching Power Supply Apparatus 30 According to the Second Embodiment Instead of driving the transistor 42a with the control voltage VG2a, the synchronous rectifier circuit 42 of the switching power supply apparatus 30 according to the second embodiment generates the gate voltage VG2 based on the control voltage VG2a and the gate voltage VG1 and drives the transistor 42a using this gate voltage VG2. The gate voltage VG1 changes at the same timing as the drain voltage VD1 and when the drain voltage VD1 falls to 0V, the gate voltage VG1 rises from the L level to the H level. This means that by generating the gate voltage VG2 based on a logical AND calculated for the control voltage VG2a and a voltage produced by inverting the logic level of the gate voltage VG1, the same effect as the switching power supply apparatus 10 according to the first embodiment that uses changes in the drain voltage Vd1 is obtained.

Figure 9:
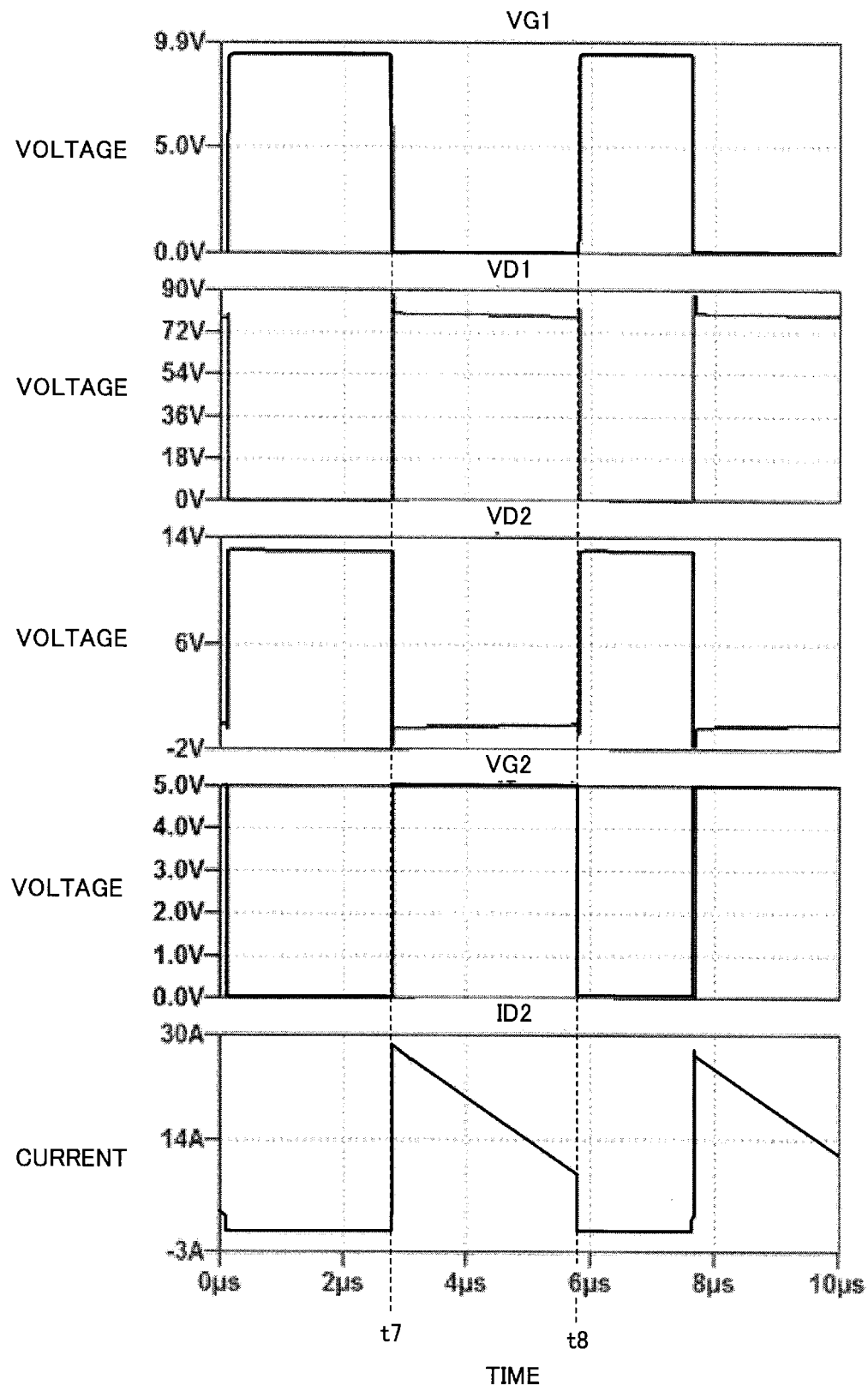
FIG. 9 depicts one example of operation simulation results in continuous current mode of the switching power supply apparatus according to the second embodiment.

FIG. 9 depicts one example of operation simulation results in continuous current mode of the switching power supply apparatus according to the second embodiment.

Figure 10:
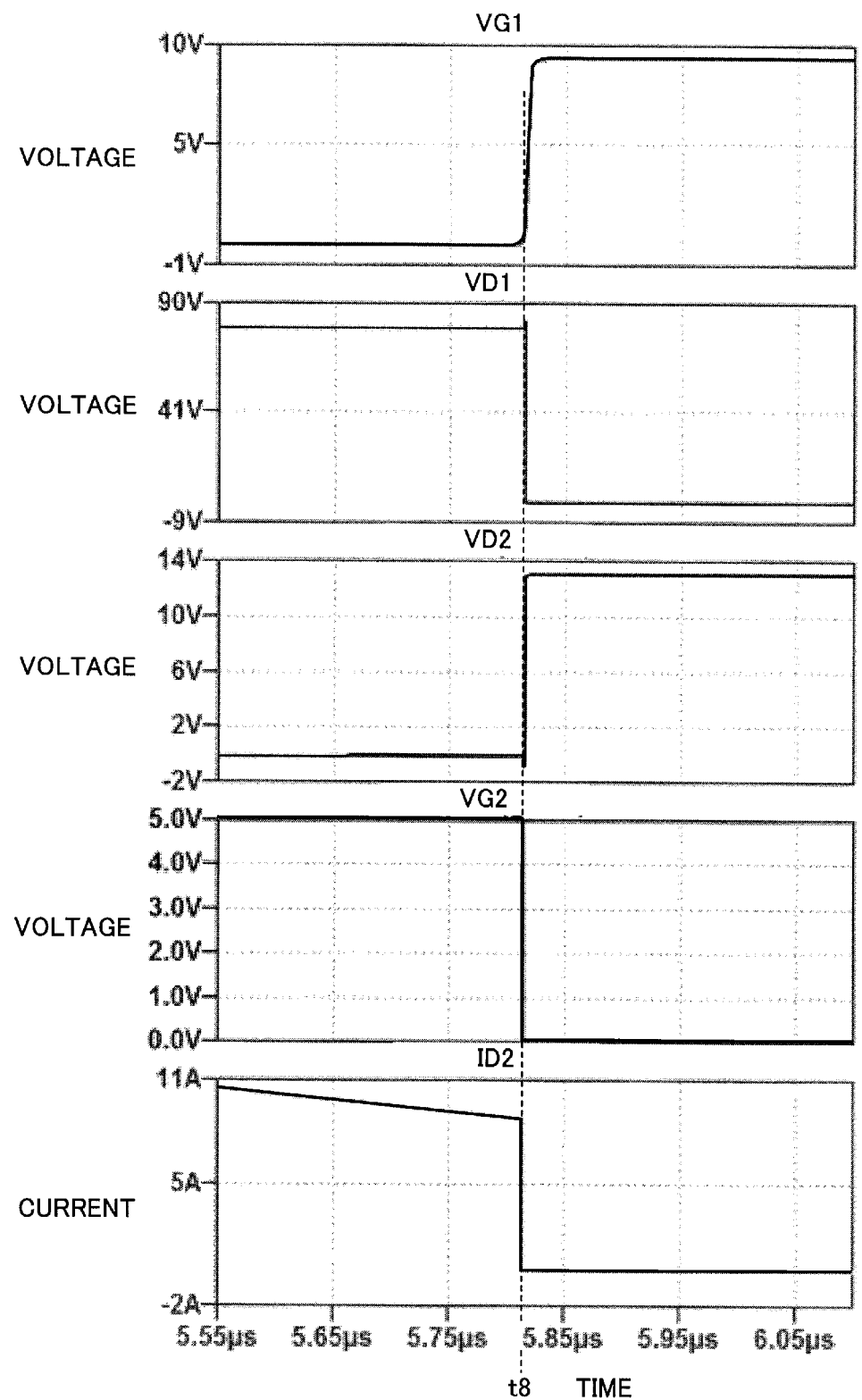
FIG. 10 is an enlargement of a period that is part of FIG. 9.

FIG. 10 is an enlargement of a period that is part of FIG. 9.

From the top in FIGS. 9 and 10, the respective waveforms of the gate voltage VG1, the drain voltage VD1, the drain voltage VD2, the gate voltage VG2, and the drain current ID2 are depicted. The horizontal axis represents time and the vertical axis represents voltage for the graphs depicting voltage waveforms and represents current for the graphs depicting current waveforms. Note that aside from the use of the control voltage generating circuit 42c, the simulation conditions are the same as the conditions described earlier.

When the gate voltage VG1 of the transistor 32 falls from the H level to the L level (at timing t7), the transistor 32 is turned off and the drain voltage Vd1 rises from 0V.

When the transistor 32 is turned off, due to the magnetic energy accumulated in the transformer 41, the drain current ID2 also flows via the body diode of the transistor 42a or the diode 42d from the source electrode toward the drain electrode. At this time, the drain voltage VD2 changes to a negative value, and when this change is detected by the secondary-side control IC 42b, the secondary-side control IC 42b raises the control voltage VG2a from the L level to the H level.

As described earlier, the drain voltage VD2 rises as the drain current ID2 falls, and when a given threshold is exceeded, the secondary-side control IC 42b lowers the control voltage VG2a from the H level to the L level. However, in the example in FIG. 9, before the drain voltage VD2 exceeds the threshold (that is, before the accumulated magnetic energy is entirely spent), the drain voltage VD1 falls to 0V due to the transistor 32 turning on (at timing t8).

With the synchronous rectifier circuit 42 of the switching power supply apparatus 30 according to the second embodiment, when the gate voltage VG1 rises from the L level to the H level, the output voltage of the AND circuit 42c2 in the control voltage generating circuit 42c becomes the L level. By doing so, as depicted in FIG. 10, the gate voltage VG2 also becomes the L level. This means that the transistor 42a is turned off irrespective of the control voltage VG2a. Accordingly, the drain current ID2 becomes 0 A and the generation of a reverse current is suppressed, thereby suppressing the production of a power loss.

As described above, with the switching power supply apparatus 30 according to the second embodiment also, the same effect as the switching power supply apparatus 10 according to the first embodiment is obtained.

Note that in the switching power supply apparatus 30 according to the second embodiment, although the gate electrode of the transistor 32 and the synchronous rectifier circuit 42 are directly connected as depicted in FIG. 5, the present embodiments are not limited to this. It is possible to separately provide a transformer including a winding that is connected to the gate electrode of the transistor 32 and a winding connected to the control voltage generating circuit 42c and to have the control voltage generating circuit 42c receive a voltage that is proportional to the gate electrode of the transistor 32 via this transformer.

Third Embodiment

Figure 11:
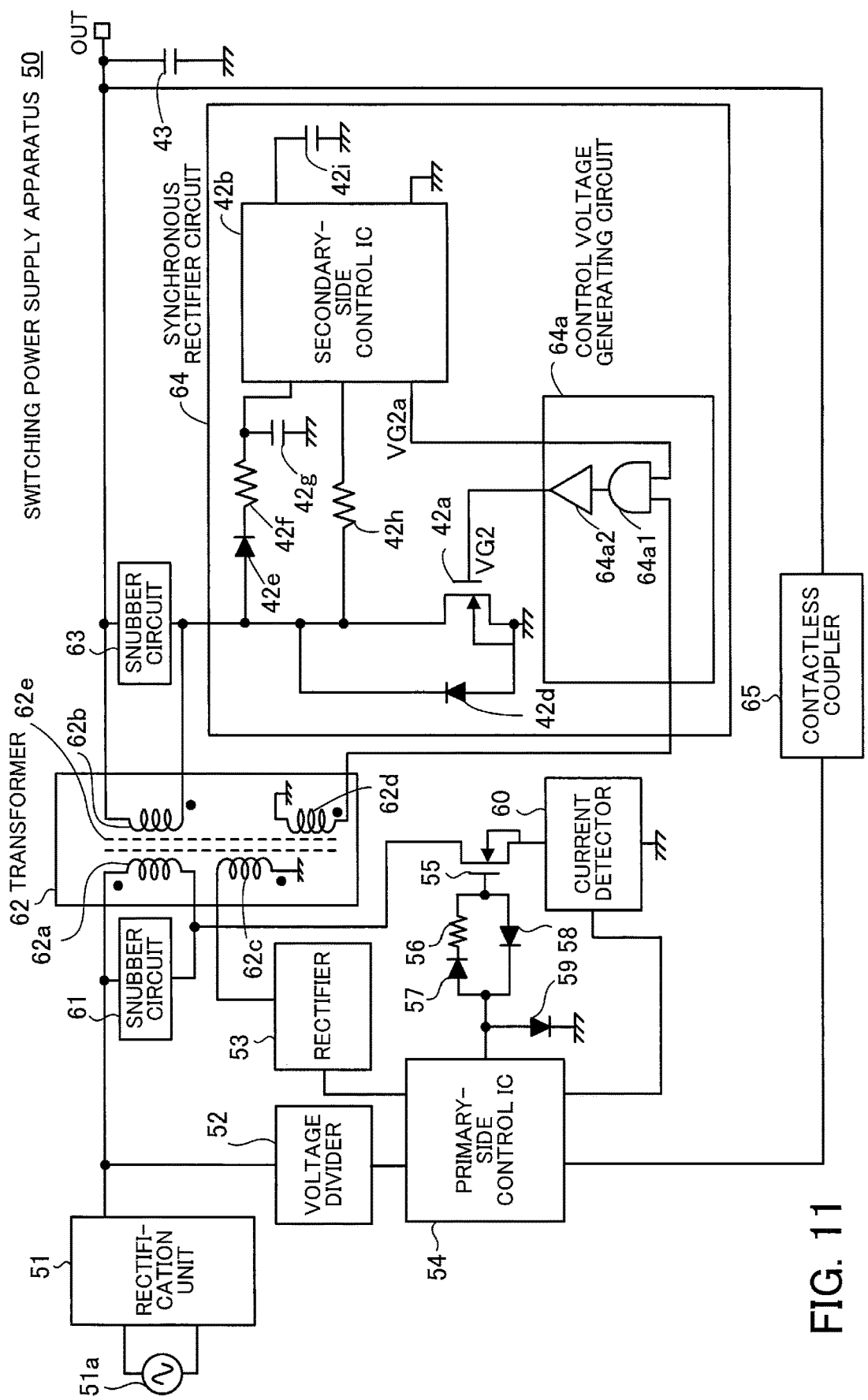
FIG. 11 depicts one example of a switching power supply apparatus and a synchronous rectifier circuit according to a third embodiment.

FIG. 11 depicts one example of a switching power supply apparatus and a synchronous rectifier circuit according to a third embodiment. Note that in FIG. 11, elements that are the same as elements depicted in FIG. 5 have been assigned the same reference numerals.

A switching power supply apparatus 50 according to a third embodiment is an AC/DC converter.

A primary-side circuit of the switching power supply apparatus 50 includes a rectification unit 51, a voltage divider 52, a rectifier 53, a primary-side control IC 54, a transistor 55, a resistance element 56, diodes 57, 58, and 59, a current detector 60, and a snubber circuit 61. The switching power supply apparatus 50 includes a transformer 62 that magnetically couples but electrically isolates the primary-side circuit and a secondary-side circuit. The secondary-side circuit includes a snubber circuit 63, a synchronous rectifier circuit 64, and a capacitor 43. The switching power supply apparatus 50 also includes a contactless coupler 65.

Note that in the following description, the transistor 55 is assumed to be an n-channel type FET. As examples, this FET may be an Si-MOSFET, a FET that uses GaN, or a FET that uses GaAs.

The rectification unit 51 rectifies an AC voltage and outputs a rectified signal. As one example, the rectification unit 51 includes a common mode choke filter connected via a fuse to an AC power supply 51a, a diode bridge that rectifies an AC voltage outputted from the common mode choke filter, and a capacitor that smoothes a rectified signal outputted from the diode bridge. The rectification unit 51 may also include a coil that blocks a high-frequency signal included in the rectified signal.

The voltage divider 52 divides the rectified signal outputted by the rectification unit 51 to generate part of a power supply voltage of the primary-side control IC 54.

The rectifier 53 rectifies part of a pulse wave AC signal that has been transformed by the transformer 62 to generate another part of the power supply voltage of the primary-side control IC 54.

When the power supply voltage reaches a voltage that enables operations to be performed, the primary-side control IC 54 outputs a gate voltage that controls switching operations of the transistor 55.

The primary-side control IC 54 also receives an error signal, which indicates an error between the output voltage (DC voltage) of the switching power supply apparatus 50 and an expected output voltage, from the contactless coupler 65. The primary-side control IC 54 then adjusts the duty ratio to an appropriate value based on the error signal. In addition, when the current detected by the current detector 60 is an abnormal value, the primary-side control IC 54 stops the switching operations of the transistor 55, for example.

The transistor 55 includes a drain electrode that is connected to a primary winding 62a of the transformer 62, a source electrode connected via the current detector 60 to GND, and a gate electrode that receives the gate voltage. The transistor 55 is turned on and off in keeping with the gate voltage supplied from the primary-side control IC 54.

Note that in the example in FIG. 11, the resistance element 56 and the diodes 57 and 58 for adjusting the slope of falls and rises in the gate voltage are connected between the gate electrode of the transistor and the primary-side control IC 54. One end of the resistance element 56 is connected to the gate electrode of the transistor 55, another end of the resistance element 56 is connected to the cathode of the diode 57, and the anode of the diode 57 is connected to the primary-side control IC 54. The anode of the diode 58 is connected to the gate electrode of the transistor 55 and the cathode of the diode 58 is connected to the primary-side control IC 54.

In the example in FIG. 11, the diode 59 whose anode is connected between the gate electrode of the transistor 55 and the primary-side control IC 54 and whose cathode is connected to GND is also provided. The diode 59 protects the transistor 55 from an excessive gate voltage.

The current detector 60 detects the value of a current flowing to the source electrode of the transistor 55.

The snubber circuit 61 is connected in parallel to the primary winding 62a of the transformer 62 and absorbs surge voltage energy generated at the drain electrode of the transistor 55.

The transformer 62 includes the primary winding 62a, the secondary winding 62b, auxiliary windings 62c and 62d, and a core 62e.

One end of the primary winding 62a is connected to the rectification unit 51 and another end is connected to the drain electrode of the transistor 55. One end of the secondary winding 62b is connected to one end of the capacitor 43 and to the output terminal OUT of the switching power supply apparatus 50. Another end of the secondary winding 62b is connected to the synchronous rectifier circuit 64. One end of the auxiliary winding 62c is connected to the rectifier 53 and another end is connected to GND. One end of the auxiliary winding 62d is connected to GND and another end is connected to the synchronous rectifier circuit 64.

The turns ratio between the primary winding 62a and the secondary winding 62b is decided in keeping with the value of the output voltage. As one example, when a voltage of 141V is obtained as a virtual DC voltage by the rectification unit 51 from an AC voltage of 100V, to set an output voltage outputted from the output terminal OUT at 5V, the turns ratio between the primary winding 62a and the secondary winding 62b is set of 141:5.

The snubber circuit 63 is connected in parallel to the secondary winding 62b of the transformer 62 and absorbs surge voltage energy generated at the drain electrode of the transistor 42a of the synchronous rectifier circuit 64.

The synchronous rectifier circuit 64 includes a control voltage generating circuit 64a that differs from the control voltage generating circuit 42c of the synchronous rectifier circuit 42 according to the second embodiment.

The control voltage generating circuit 64a includes an AND circuit 64a1 and an amplifier 64a2.

Out of the two input terminals of the AND circuit 64a1, a voltage that is proportional to the drain voltage of the transistor 55 is supplied to one input terminal by the auxiliary winding 62d and the control voltage VG2a outputted by the secondary-side control IC 42b is supplied to the other input terminal. The AND circuit 64a1 calculates a logical AND for the voltages supplied to the respective input terminals.

Note that in the same way as the control voltage generating circuit 14c of the synchronous rectifier circuit 14 according to the first embodiment, an attenuator may be connected to the input terminals of the AND circuit 64a1.

The amplifier 64a2 generates and outputs the gate voltage VG2 by amplifying the output voltage of the AND circuit 64a1 to an appropriate value for driving the transistor 42a.

Note that when the output voltage of the AND circuit 64a1 is an appropriate value for driving the transistor 42a, the amplifier 64a2 may be omitted. An integrated driver circuit that adjusts the gate voltage VG2 outputted by the control voltage generating circuit 64a to a more appropriate value for the transistor 42a may also be separately provided.

The contactless coupler 65 generates an error signal indicating an error between the output voltage of the switching power supply apparatus 50 and an expected output voltage, and transmits the error signal to the primary-side control IC 54 via a photo coupler, for example.

With this switching power supply apparatus 50, in the same way as the switching power supply apparatus 10 according to the first embodiment, when the drain voltage of the transistor 55 falls to 0V, the output voltage of the AND circuit 64a1 of the control voltage generating circuit 64a becomes the L level. As a result, the gate voltage VG2 also becomes the L level. This means that the transistor 42a is turned off irrespective of the control voltage VG2a. Accordingly, the drain current of the transistor 42a becomes 0 A and the generation of a reverse current is suppressed, thereby suppressing the production of a power loss.

For the reason given above, the switching power supply apparatus 50 according to the third embodiment obtains the same effect as the switching power supply apparatus 10 according to the first embodiment.

Fourth Embodiment

Figure 12:
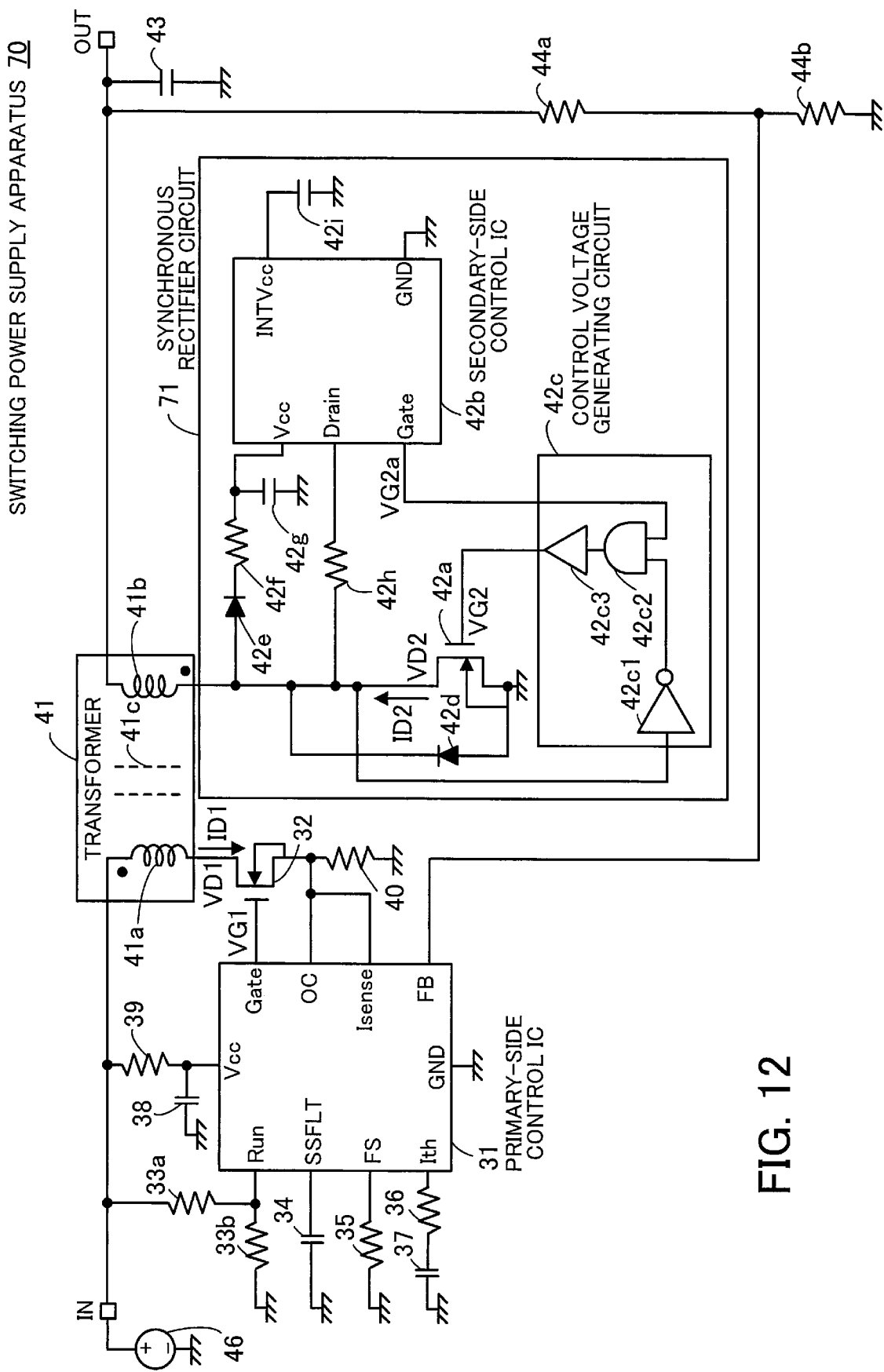
FIG. 12 depicts one example of a switching power supply apparatus and a synchronous rectifier circuit according to a fourth embodiment.

FIG. 12 depicts one example of a switching power supply apparatus and a synchronous rectifier circuit according to a fourth embodiment. Note that in FIG. 12, elements that are the same as elements depicted in FIG. 5 have been assigned the same reference numerals.

In a switching power supply apparatus 70 according to the fourth embodiment, the control voltage generating circuit 42c of the synchronous rectifier circuit 71 is supplied with the drain voltage VD2 in place of the gate voltage VG1. As depicted in FIGS. 9 and 10, the drain voltage VD2 changes at the same timing as the drain voltage VD1, and when the drain voltage VD1 falls to 0V, the drain voltage VD2 rises to a positive value. This means that by generating the gate voltage VG2 based on a logical AND calculated for the control voltage VG2a and a voltage produced by inverting the logic level of the drain voltage VD2, the same effect as the switching power supply apparatus 50 according to the second embodiment that uses changes in the gate voltage VG1 is obtained.

Although several examples of a synchronous rectifier circuit and a switching power supply apparatus according to the present embodiments have been described above, the content given above is to be regarded as illustrative examples to which the present embodiments are not limited.

As one example, although configurations where n-channel FETs are used as the transistors 12, 14a, and the like in FIG. 1 have been described, p-channel FETs may be used.

According to the present embodiments, it is possible to reduce a power loss during continuous current mode in an isolated synchronous rectification-type switching power supply apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A synchronous rectifier circuit comprising:
   a first transistor that has a first terminal, which is connected to a secondary winding of a transformer included in an isolated synchronous rectification-type switching power supply apparatus, and a second terminal, to which a first control voltage is applied, and performs a switching operation based on the first control voltage;
   a control circuit that detects a first voltage of the first terminal and outputs, based on the first voltage, a second control voltage that controls the switching operation of the first transistor; and a control voltage generating circuit that generates the first control voltage based on the second control voltage and one of a second voltage of a third terminal of a second transistor and a third voltage that changes at a same timing as the second voltage, the third terminal being electrically connected to a primary winding of the transformer, the second transistor performing a switching operation based on a third control voltage applied to a fourth terminal of the second transistor, wherein the first control voltage changes and turns the first transistor off irrespective of the second control voltage at a same timing as the second voltage changes from a first value to a second value which is lower than the first value; and wherein, when the switching power supply apparatus is operating in continuous current mode, at the same timing as the second voltage changes from the first value to the second value, the control voltage generating circuit changes the first control voltage before the second control voltage changes.

2. The synchronous rectifier circuit according to claim 1, wherein the control voltage generating circuit generates the first control voltage based on a logical AND calculated for the second control voltage and one of the second voltage and a fourth voltage produced by inverting a logic level of the third voltage.

3. The synchronous rectifier circuit according to claim 1, wherein the third voltage is the third control voltage.

4. The synchronous rectifier circuit according to claim 1, wherein the third voltage is the first voltage.

5. The synchronous rectifier circuit according to claim 1, wherein the control voltage generating circuit is connected to an auxiliary winding provided in the transformer and detects changes in the second voltage via the auxiliary winding.

6. The synchronous rectifier circuit according to claim 5, wherein the control voltage generating circuit includes:

a first attenuator with a first input terminal connected to one end of the auxiliary winding;

a second attenuator with a second input terminal connected to an output terminal of the control circuit that outputs the second control voltage;

a logical AND circuit that calculates a logical AND of a first output voltage of the first attenuator and a second output voltage of the second attenuator; and an amplifier that generates the first control voltage by amplifying an output voltage of the logical AND circuit.

7. An isolated synchronous rectification-type switching power supply apparatus comprising:

a transformer including a primary winding and a secondary winding;

a first transistor that includes a first terminal and a second terminal, the first terminal being electrically connected to the primary winding, the first transistor performing a switching operation based on a first control voltage applied to the second terminal;

a second transistor that includes a third terminal, which is connected to the secondary winding, and a fourth terminal, to which a second control voltage is applied, and performs a switching operation based on the second control voltage;

a control circuit that detects a first voltage of the third terminal and outputs, based on the first voltage, a third control voltage that controls the switching operation of the second transistor; and a control voltage generating circuit that generates the second control voltage based on the third control voltage and one of a second voltage of the first terminal of the first transistor and a third voltage that changes at a same timing as the second voltage, wherein the second control voltage changes and turns the second transistor off irrespective of the third control voltage at a same timing as the second voltage changes from a first value to a second value which is lower than the first value; and wherein, when the switching power supply apparatus is operating in continuous current mode, at the same timing as the second voltage changes from the first value to the second value, the control voltage generating circuit changes the second control voltage before the third control voltage changes.

* * * * *